UNITED STATES PATENT OFFICE.

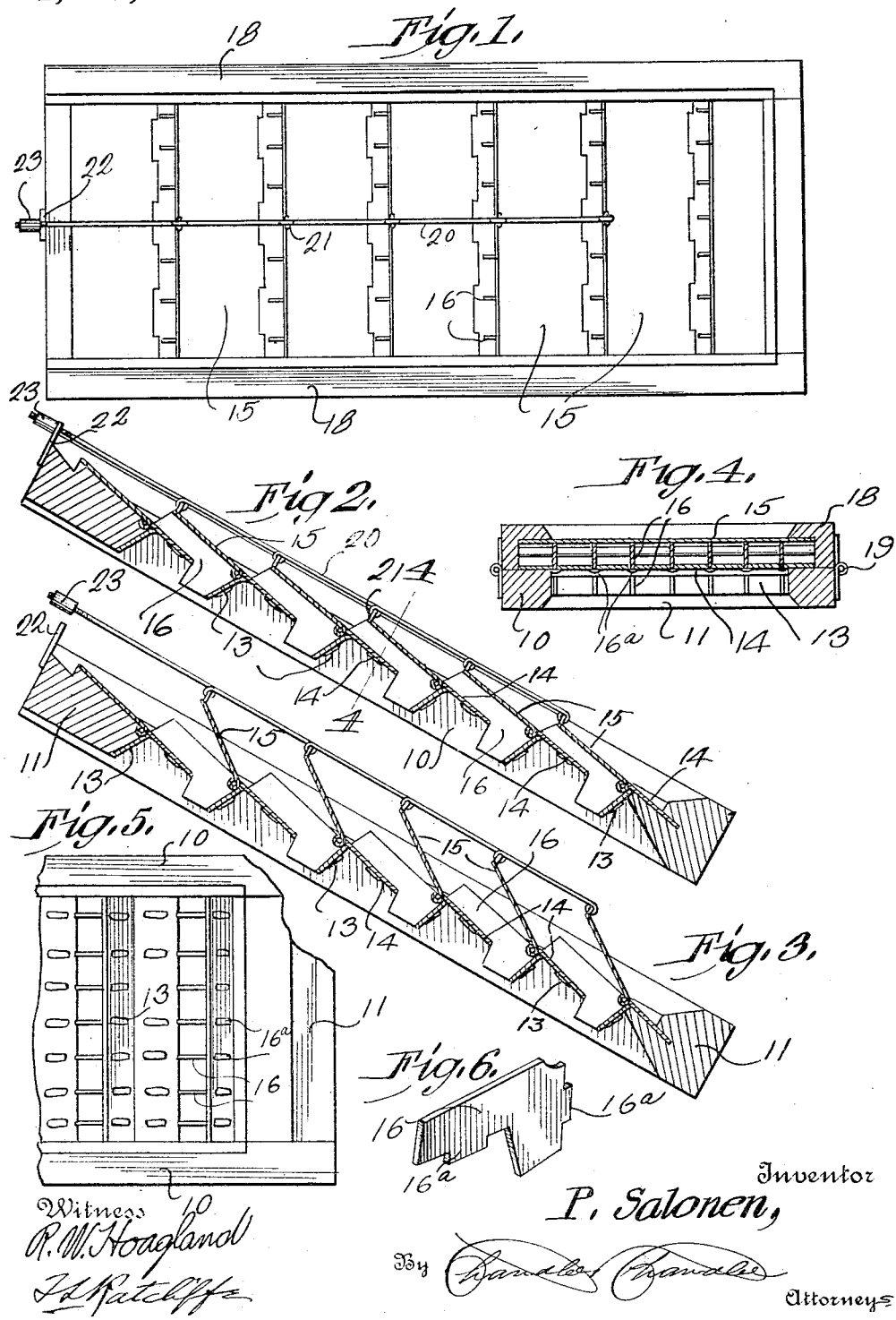
P. SALONEN.
WILD OAT SIEVE.
APPLICATION FILED JULY 8, 1918.
1,288,213. Patented Dec. 17, 1918.

PAUL SALONEN, OF BRYANT, SOUTH DAKOTA.

WILD-OAT SIEVE.

1,288,213.

Specification of Letters Patent. Patented Dec. 17, 1918.

Application filed July 8, 1918. Serial No. 243,787.

*To all whom it may concern:*

Be it known that I, PAUL SALONEN, a citizen of the United States, residing at Bryant, in the county of Hamlin, State of South Dakota, have invented certain new and useful Improvements in Wild-Oat Sieves; and I do hereby declare the following to be a full, clear, and exact description of the invention, such as will enable others skilled in the art to which it appertains to make and use the same.

The present invention relates to new and useful improvements in grain separating sieves more particularly of that type adapted to separate wild oats from crop grains with which they are mixed.

It is in general the object of this invention to simplify and otherwise improve the structure of sieves of this character, and to increase their efficiency.

A more detailed and important object resides in the provision of an arrangement whereby ready access may be had to the passages of the sieve for the cleansing thereof should they become clogged.

With the above and other objects and advantages in view, the invention resides more particularly in the novel combination, formation and arrangement of parts hereinafter described and particularly pointed out in the appended claims.

In the accompanying drawings:

Figure 1 is a plan view of a sieve constructed in accordance with the present invention.

Fig. 2 is a vertical longitudinal section taken centrally of the structure as illustrated in Fig. 1 but with the shifting rod and its guide lug in elevation.

Fig. 3 is a similar view, but showing the parts in open position to facilitate cleaning.

Fig. 4 is a transverse sectional view through the sieve.

Fig. 5 is a fragmentary bottom plan view.

Fig. 6 is a perspective view of one of the sieve partitions.

Referring now more particularly to the accompanying drawings, there is provided a frame formed of side bars 10 and end bars 11. The side bars are provided with transverse recesses 12 open at their inner sides, and extended transversely between the bars with their ends seated in said recesses are a series of plates 13 disposed obliquely with respect to the frame sides and forming the rear walls of the sieve passages. The upper edges of these oblique wall plates are secured to the forward edge portions of floor plates 14, the rear edge of each floor plate being spaced from the next adjacent wall plate 13, while its forward edge extends slightly forwardly of the wall plate for hinge connection with a slide plate 15 extending forwardly over the adjacent floor plate 14.

For dividing the spaces between the plates into series of grain passages, a plurality of partition plates 16 are mounted on each floor plate 14, these partition plates being of height equal to the distance between the fixed floor plate and the hinged slide plate when said plates are in substantially parallel relation. The partition plates extend across the space between the floor plate and the next rearward wall plate and are provided with depending portions projecting therebetween below the floor plates. With the slide plates engaging the tops of the partitions, transverse series of angular passages are thus provided through which crop grains may readily pass, but which are of such size and arrangement as to prevent the passage therethrough of wild oat grains, and said wild oat grains will gradually work downwardly over the slide plates in operation of the sieve.

For inclosing the sieve plate structure, at the sides of the frame, bars 18 are secured by hinges 19 to the side bars 10 of the frame, and these bars have their lower portions cut away whereby they may be folded to overlie the sides of the plate structure and receive the plate ends in their cut away portions.

Upon swinging the bars 18 away from the plate structure, the slide plates 15 may be lifted to thus expose the grain passages and permit a most ready cleansing thereof should they become clogged. Opening movement of these slide plates is controlled by a rod 20 extended longitudinally over the sieve and pivotally connected with eyes 21 secured to the central portions of the free edges of the slide plates. For holding the slide plates firmly against the partition plates 16, the end of the rod 19 at the normally upper end of the sieve is engageable in a slotted lug 22 projecting from the end frame bar 11 and has threaded thereon a wing nut 23 engageable against the lug.

The partition plates 16 are secured in place by lugs $16^a$ on their bottom and rear edges which are respectively passed through the corresponding floor plates 14 and wall plates 13, the upper and forward edges of the partition plates being thus free to avoid any obstruction to grain moving through the passages.

An exceedingly simple and efficient sieve structure of the class described has thus been provided which may be most readily cleansed upon clogging of any of its passages.

What is claimed is:

1. A sieve of the class described comprising a frame, a series of spaced wall plates extending transversely between the sides of the frame, floor plates secured to and extending rearwardly from the upper edges of the wall plates, slide plates having their rearward edges hinged adjacent the junctures of the floor and wall plates and partitions mounted on the floor plates and extending longitudinally between the floor plates and the hinge slide plates.

2. A sieve of the class described comprising a frame, a series of spaced wall plates extending transversely between the sides of the frame, floor plates secured to and extending rearwardly from the upper edges of the wall plates, the forward edge portions of the floor plates extending forwardly of the wall plates, slide plates hinged to said forward edge portions and disposed above the floor plate and partitions mounted on the floor plates and extending longitudinally between the floor plates and the hinged slide plates.

3. A sieve of the class described comprising a frame, a series of spaced wall plates extending transversely between the sides of the frame, floor plates secured to and extending rearwardly from the upper edges of the wall plates, slide plates having their rearward edges hinged adjacent the junctures of the floor and wall plates, partitions mounted on the floor plates and extending longitudinally between the floor plates and the hinged slide plates, and means connecting the slide plates for procuring simultaneous pivotal movement thereof.

In testimony whereof, I affix my signature, in the presence of two witnesses.

PAUL SALONEN.

Witnesses:
E. J. GEBBIE,
C. V. McLAIN.

Copies of this patent may be obtained for five cents each, by addressing the "Commissioner of Patents, Washington, D. C."